(12) United States Patent
MacKay et al.

(10) Patent No.: US 7,702,543 B2
(45) Date of Patent: Apr. 20, 2010

(54) METHODS AND SYSTEMS FOR PROVIDING A CONSUMER SHOPPING EXPERIENCE WHEREBY THE AVAILABILITY OF SERVICES IS INDICATED

(75) Inventors: Kenneth C. MacKay, Atlanta, GA (US); Gloria J. Calhoun, Atlanta, GA (US); Hilary P. Phillips, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 191 days.

(21) Appl. No.: 11/301,914

(22) Filed: Dec. 13, 2005

(65) Prior Publication Data

US 2007/0136775 A1   Jun. 14, 2007

(51) Int. Cl.
G06Q 30/00 (2006.01)
G06F 17/30 (2006.01)
(52) U.S. Cl. .......................................... 705/26; 705/27
(58) Field of Classification Search ............. 705/26–27, 705/28, 29, 75, 14, 1
See application file for complete search history.

(56) References Cited

U.S. PATENT DOCUMENTS

| | | | | |
|---|---|---|---|---|
| 6,885,997 | B1 * | 4/2005 | Roberts ........................ | 705/26 |
| 6,970,838 | B1 * | 11/2005 | Kamath et al. ................. | 705/26 |
| 7,139,728 | B2 * | 11/2006 | Rigole ........................... | 705/26 |
| 2001/0027425 | A1 * | 10/2001 | Davies .......................... | 705/26 |
| 2001/0044743 | A1 * | 11/2001 | McKinley et al. ............. | 705/14 |
| 2002/0004757 | A1 * | 1/2002 | Torres et al. ................... | 705/26 |
| 2002/0161664 | A1 * | 10/2002 | Shaya et al. ................... | 705/26 |
| 2003/0115113 | A1 * | 6/2003 | Duncan ......................... | 705/26 |
| 2004/0059626 | A1 * | 3/2004 | Smallwood .................... | 705/10 |
| 2005/0131765 | A1 * | 6/2005 | Rivera et al. .................. | 705/26 |
| 2005/0154646 | A1 * | 7/2005 | Chermesino .................. | 705/26 |
| 2006/0212359 | A1 * | 9/2006 | Hudgeon ....................... | 705/26 |
| 2007/0203799 | A1 * | 8/2007 | Caballero et al. ............. | 705/26 |

OTHER PUBLICATIONS www.dishnetwork.com. Jan. 24, 2003 (Jan. 24, 2003). Recovered from www.Archive.org on Nov. 8, 2008.*
www.bellsouth.com. Feb. 2, 2003-Jun. 4, 2005 recovered from the Internet Wayback Machine on Apr. 20, 2009 [www.Archive.org].*

(Continued)

*Primary Examiner*—Jeffrey A. Smith
*Assistant Examiner*—William J. Allen
(74) *Attorney, Agent, or Firm*—Jackson Walker L.L.P.

(57) ABSTRACT

Systems and methods are disclosed for providing a consumer shopping experience. The disclosed systems and methods include receiving a user input and providing, in response to the user input, one of a first series of pages, a second series of pages, and a third series of pages. Furthermore, the first series of pages are configured to allow a user to select at least one of products and services from at least one business line before the first series of pages request personal information. In addition, the second series of pages are configured to indicate whether currently received services at a first location are available at a second location. Moreover, the third series of pages are configured to allow the user to select at least one of products and services from the at least one business line.

17 Claims, 14 Drawing Sheets

OTHER PUBLICATIONS

"Bellsouth Unveils New Bundling Options for Small Businesses". RBOC Update. Boynton Beach: Jun. 1, 2004. vol. 15, Iss. 6. Recovered from Proquest database on Apr. 20, 2009.*

"Verizon Adds New Freedom Calling Plan; Introduces Discount for Bundled Internet, DIRECTV and Wireless One-Bill Options". PR Newswire. New York: Nov. 9, 2004. p. 1. Recovered from Proquest database on Apr. 20, 2009.*

"Getting online getting quicker for local businesses". Valerie Miller. Las Vegas Business Press. Las Vegas: Aug. 2, 2004. vol. 21, Iss. 29; p. 2. Recovered from Proquest database on Apr. 20, 2009.*

Verizon Adds New Freedom Calling Plan; Introduces Discount for Bundled Internet, DIRECTV and Wireless One-Bill Options PR Newswire. New York: Nov. 9, 2004. p. 1 [rovered from Proquest database on Jun. 8, 2009].*

* cited by examiner

240

BELLSOUTH®                    Home    Special Needs    Search    Contact Us    About BellSouth

| Residential | Small Business | Large Business | My Account |                What would you like to do?

Welcome to BellSouth!      Georgia - Atlanta Metro                    ordering help    view selections
Sign In                    Change Location >> Change Your Selection for a Better Deal

|                                                    | This package includes the same features as your selection and more, |
| You've just added the following:                   | for a lower monthly price:                                          |

310

Residential Line
» 3-Way Calling w/Trnf
» Call Return (*69)
» Call Waiting Deluxe
» Caller ID Deluxe
» Preferred Call Forwarding
» Remote Access to Call Forwarding
» Speed Calling-30
» Voice Mail

BellSouth® Complete Choice Plan
» 3-Way Calling w/Trnf
» Call Return (*69)
» Call Waiting Deluxe
» Caller ID Deluxe
» Preferred Call Forwarding
» Remote Access to Call Forwarding
» Speed Calling-30
» Voice Mail

305

Estimated Monthly Cost:   $54.95          Estimated Monthly Cost:   $34.95
           [select]                                  [select]

260

> BellSouth Answers® Service Advisor

Start »

 CINGULAR WIRELESS®

Do you currently have Cingular Wireless service?
○ Yes
⦿ No

How often do you use your wireless phone?
○ Several times a day
○ At least once a day
⦿ Several times a week or less

Are you interested in sharing a wireless plan with your family members, where you each have your own number, but share minutes?
⦿ Yes
    And I will need [3] phone(s) for additional family members.
○ No

[exit the advisor]        [start over] [continue]

Copyright 1995-2005 BellSouth Corp. All Rights Reserved.
Legal Notices | Privacy Policy | Site Map | Feedback

> BellSouth Answers® Service Advisor

Start »

 DIGITAL TV

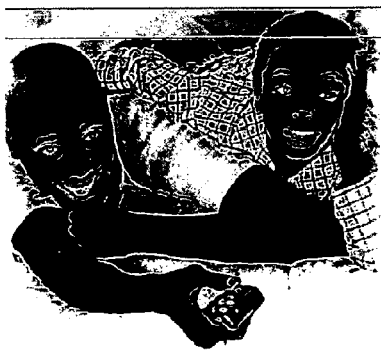

What television programming are you interested in? Check all that apply:
☑ Local Channels
☑ News
☑ Movies
☑ Sports
☑ Audio Music Chanels
☐ Family Educational and Children's Programming
☐ I want all basic programming

What premium packages would you like? Check all that apply:
☑ HBO® - 7 HBO channels
☐ STARZ Super Pak® - 12 movie channels
☐ Cinemax® - 3 Cinemax channnels
☐ Showtime Unlimited® - 9 Showtime channels
☐ Sports Pack - Over 25 sports networks
☐ I want all premium packages
☐ No premium packages

[exit the advisor]        [start over] [continue]

Copyright 1995-2005 BellSouth Corp. All Rights Reserved.
Legal Notices | Privacy Policy | Site Map | Feedback

*FIG. 7b*

@ BELLSOUTH® back to BellSouth.com

> BellSouth Answers® Service Advisor

Start »

We recommend the following bundles for you:

| Bundle # 1 | Monthly Rate | Bundle Savings | Bundle # 2 | Monthly Rate | Bundle Savings |
|---|---|---|---|---|---|
| LOCAL | | | LOCAL | | |
| BellSouth® Complete Choice® Plan | $34.00 | | Residential Line With Unlimited Local Calls | $17.45 | |
| ⊞ Calling Features | | | ⊞ Calling Features | | |
| Features Total | $7.90 | | Features Total | $65.90 | |
| LONG DISTANCE | | | LONG DISTANCE | | |
| BellSouth® Unlimited plan | $20.99 | | BellSouth® Basic Unlimited Value Plan | $29.99 | |
| BellSouth® International Advantage At Home Value plan | $2.95 | | BellSouth® International Advantage At Home Value plan | $2.95 | |
| INTERNET | | | INTERNET | | |
| BellSouth® FastAccess® DSL Ultra | $42.95 | -$10.00 | BellSouth® FastAccess® DSL Ultra | $42.95 | -$2.00 |
| WIRELESS | | | WIRELESS | | |
| GSM Nation FamilyTalk 450 | $39.99 | -$10.00 | GSM Nation FamilyTalk 450 | $39.99 | -$2.00 |
| Additional Users | $19.99 | | Additional Users | $19.99 | |
| DIGITAL TV | | | DIGITAL TV | | |
| DIRECTV TOTAL CHOICE | $41.99 | -$10.00 | DIRECTV TOTAL CHOICE | $41.99 | -$2.00 |
| Premium packages - 1 | $12.00 | | Premium packages - 1 | $12.00 | |
| Regular Price | $222.76 | | Regular Price | $273.21 | |
| Bundle Savings | -$30.00 | | Bundle Savings | -$6.00 | |
| Monthly Cost | $192.76 | | Monthly Cost | $267.21 | |

[add to order]                                    [add to order]

DIRECTV Programming Note: Your order will be for the basic programming package. You will finalize your programming, including premium packages, at the time of installation.

[exit the advisor]  [start over]

Copyright 1995-2005 BellSouth Corp. All Rights Reserved.
Legal Notices | Privacy Policy | Site Map | Feedback

BELLSOUTH°     Home   Special Needs   Search   Contact Us   About BellSouth

| Residential | Small Business | Large Business | My Account |

What would you like to do?

Welcome, Sally Mann    1234 Main Street Atlanta GA, Georgia - Atlanta Metro 30303    ordering help | view selections
Sign Out    Change Location > Move Your BellSouth Service     Chat with a BellSouth Representative Thank you for your move request. Unfortunately, some of your current BellSouth services are not available at your new address.

Target Gift Card $30 value—yours when you move your BellSouth service online. Details »

⚠ Please review the highlighted items below and make any necessary changes so that we can complete your move request.

[save for later]     [reset cart] [move my service]

LOCAL CALLING     Terms and Conditions

Good News!
Your current telephone number can be moved to your new address.

| Main Line: 555-555-5555 | One-Time Charges | Monthly Charges |
|---|---|---|
| Residential Line | | $17.45   ⊕ Change Plan |
| Local Calling Features | | ⊕ Edit Features |
| No Features Selected | | |

LONG DISTANCE     Terms and Conditions

| Main Line: 555-555-5555 | One-Time Charges | Monthly Charges |
|---|---|---|
| BellSouth® Nickel plan (Provider: BellSouth® Long Distance) | | $4.95   ⊕ Change Plan |

1002

INTERNET     Terms and Conditions

⚠ Your current DSL plan cannot be moved.
⊕ Please select another plan

| Main Line: 555-555-5555 | One-Time Charges | Monthly Charges |
|---|---|---|
| BellSouth® FastAccess DSL Xtreme | | $54.95   ⊕ Change Plan |
| Internet Features | | ⊕ Edit Features |
| » DSL Modem | $99.95 | |
| » Shipping & Handling | $14.95 | |
| Bundle Savings | | $0.00 |

WIRELESS     Terms and Conditions

None Selected

Save $10 / month on a Wireless plan with a qualifying BellSouth Answers Bundle.     ⊕ Add a Plan
Learn More »

DIGITAL TV     Terms and Conditions

None Selected

Save $10 / month on a Digital TV plan with a qualifying BellSouth Answers Bundle.     ⊕ Add a Plan
Learn More »

TOTAL CHARGES     Terms and Conditions

| | One-Time Charges | Monthly Charges |
|---|---|---|
| Subtotal | $114.90 | $77.35 |
| Transfer Fee | | |
| Bundle Savings | | $0.00   ⊕ Maximize your bundle savings |
| Special Offers | | |
| Mail-In Rebates | | |
| Total* | $114.90 | $77.35 |

Compare these services to your current service and BellSouth's recommendations

[compare services]

[save for later]     [reset cart] [move my service]

\* The total shown here does not include regulatory and possible other fees that are included when you complete your order.

BELLSOUTH®

Home | Special Needs | Search | Contact Us | About BellSouth

Residential | Small Business | Large Business | My Account

What would you like to do?

Welcome to BellSouth!
Sign In

Georgia - Atlanta Metro
Change Location ordering help | view selections

>> Customize your BellSouth® FastAccess DSL Lite

Please indicate your modem needs and select any optional services you'd like to include with your FastAccess® DSL service.

DSL Modem

You can order a new modem or use one you currently have, as long as it is in our list of "supported" modems
View FastAccess supported modems »

- ⦿ External USB/Ethernet Modem — $99.95
  Shipping & Handling — $14.95
  OR
- ○ I have my own DSL Modem

Optional Features

- ☑ HomeNetworking Plus — $1
- ☑ Parental Controls Plus & Firewall Monitor — $1
- ☑ Web Remote Access — $1
- ☑ Static IP Address — $1

[back] [continue]

METHODS AND SYSTEMS FOR PROVIDING A CONSUMER SHOPPING EXPERIENCE WHEREBY THE AVAILABILITY OF SERVICES IS INDICATED

BACKGROUND OF THE INVENTION

I. Field of the Invention

The present invention generally relates to methods and systems for providing a consumer shopping experience. More particularly, the present invention relates to providing a consumer shopping experience, for example, that allows the user to go directly into a particular shopping mode. Furthermore, the present invention relates to providing a consumer shopping experience, for example, dependent upon the user's state that in turn depends on the user's relationship with a service provider.

II. Background Information

On-line shopping systems allow users to purchase products or services over a network such as the internet. In some situations, while conventional on-line shopping systems get users into an ordering flow for on-line shopping, the conventional systems have considerable fall-out partially through the on-line shopping process. For example, this fall-out may be created because the user is in a shopping mindset, but drops out because the user is forced to first carry out non-shopping oriented tasks. These non-shopping oriented tasks may comprise having the user create passwords, enter payment and address information, or provide personal information. Thus, the conventional strategy does not allow the user to first shop and then take care of procedural issues later. This often causes problems because, with the conventional strategy, users become frustrated and fall-out partially through the on-line shopping process.

In view of the foregoing, there is a need for methods and systems for providing a consumer shopping experience more optimally. Furthermore, there is a need for providing a consumer shopping experience, for example, that allows the user to go directly into a particular shopping mode. Moreover, there is a need for providing a consumer shopping experience, for example, dependent upon the user's state that in turn depends on the user's relationship with a service provider.

SUMMARY OF THE INVENTION

Consistent with embodiments of the present invention, systems and methods are disclosed for providing a consumer shopping experience.

In accordance with one embodiment, a method for providing a consumer shopping experience comprises receiving a user input and providing, in response to the user input, one of a first series of pages, a second series of pages, and a third series of pages, wherein, the first series of pages are configured to allow a user to select at least one of products and services from at least one business line before the first series of pages request personal information, the second series of pages are configured to indicate whether currently received services at a first location are available at a second location, and the third series of pages are configured to allow the user to select at least one of products and services from the at least one business.

According to another embodiment, a system for providing a consumer shopping experience comprises a memory storage for maintaining a database and a processing unit coupled to the memory storage, wherein the processing unit is operative to receive a user input and provide, in response to the user input, one of a first series of pages, a second series of pages, and a third series of pages, wherein the first series of pages are configured to allow a user to select at least one of products and services from at least one business line before the first series of pages request personal information, the second series of pages are configured to indicate whether currently received services at a first location are available at a second location, and the third series of pages are configured to allow the user to select at least one of products and services from the at least one business line.

In accordance with yet another embodiment, a computer-readable medium which stores a set of instructions which when executed performs a method for providing a consumer shopping experience, the method executed by the set of instructions comprising receiving a user input and providing, in response to the user input, one of a first series of pages, a second series of pages, and a third series of pages, wherein, the first series of pages are configured to allow a user to select at least one of products and services from at least one business line before the first series of pages request personal information, the second series of pages are configured to indicate whether currently received services at a first location are available at a second location, and the third series of pages are configured to allow the user to select at least one of products and services from the at least one business line.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 3 through 14 are screen shots illustrating a series of pages consistent with an embodiment of the present invention.

DETAILED DESCRIPTION

Figure 1:
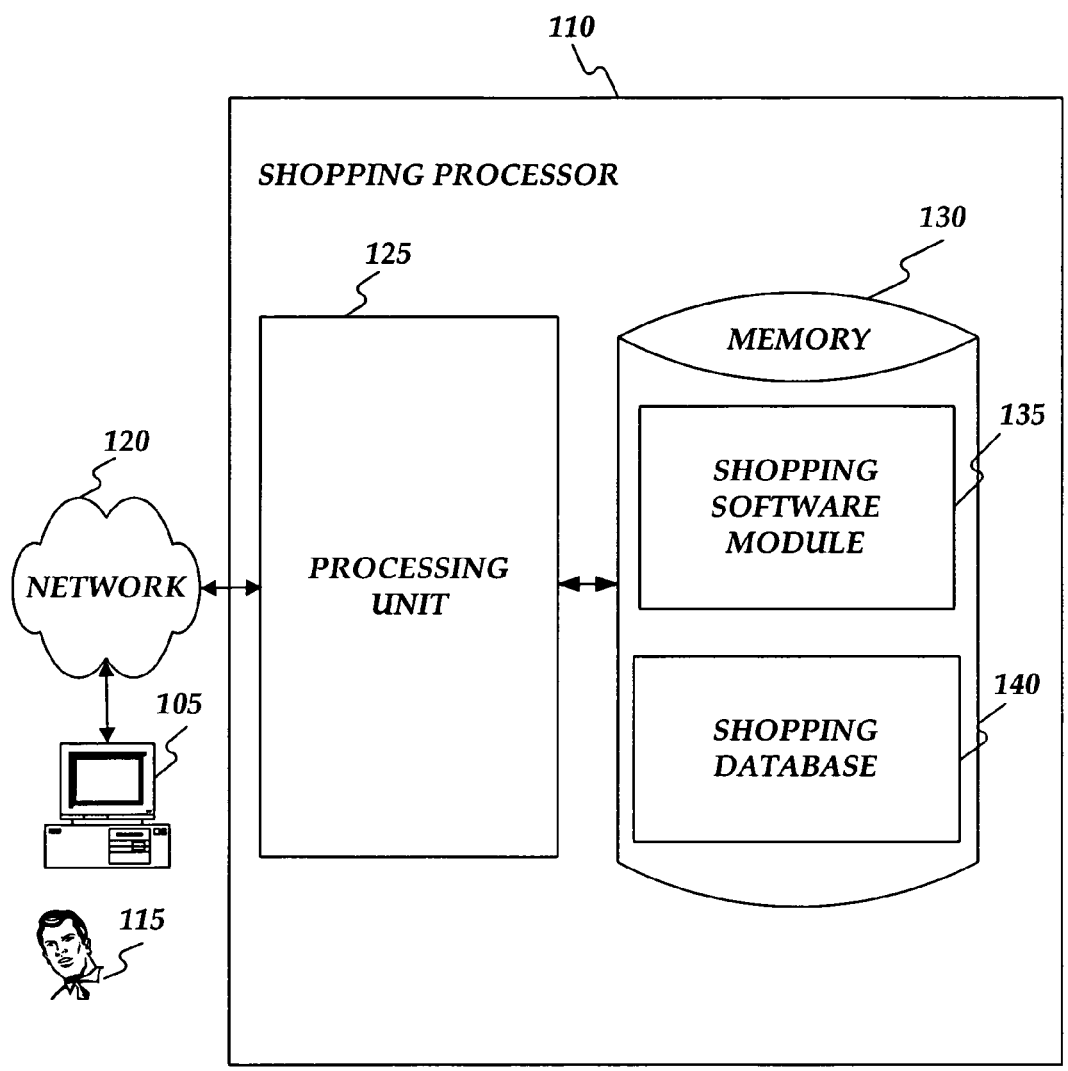
FIG. 1 is a block diagram of an exemplary shopping system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention provide a consumer shopping experience using a shopping model. For example, a service provider may provide a plurality of data and voice oriented services. A user (e.g. the service provider's customer or potential customer) may wish to establish new service with the service provider, may wish to move an existing service from one address to another, or may modify there current relationship by adding upgrading or deleting there current services. In this context, there are a number of products and services that the service provider may wish to sell the user. Consistent with embodiments of the invention, using the shopping model, the service provider may address the user's needs based on the user's current state. For example, the current state may depend on a relationship that the user already has with the service provider. The user's current state may comprise, but is not limited to, whether the user is a new customer to the service provider, a current customer, but moving to a different location, or an existing customer that would like to make changes to their existing account.

Consistent with embodiments of the invention, the shopping model may include selling products or service within a plurality of business lines. For example, the plurality of business lines may comprise, but are not limited to, local telecommunication service, long distance telecommunication service, wired or wireless voice service, wired or wireless data service, and television (TV) service including digital or analog service. Moreover, consistent with embodiments of the invention, the shopping model may allow the user to: i) log-on or stay anonymous; ii) engage in a shopping mode first, putting products or services into a virtual shopping cart; and iii) then go into a purchasing mode after the user has done all of their shopping. While conventional systems get users into an ordering flow and, within that flow, allows users to do their shopping, the conventional systems have considerable fall-out partially through the shopping process. This is because the user is in a shopping mindset, but drops out of the shopping process because they are forced to carry out non-shopping oriented tasks first. These non-shopping oriented tasks may comprise having the user create passwords, enter payment and address information, or enter other personal information. Consistent with embodiments of the invention, the shopping model allows the user to shop first, review the shopping cart, and then either save the shopping cart for future use when they come back, or because they may need to review the cart with a spouse or someone else or continue through the order completion module.

An embodiment consistent with the invention comprises a system for providing a consumer shopping experience. The system comprises a memory storage for maintaining a database and a processing unit coupled to the memory storage. The processing unit is operative to receive a user input and provide, in response to the user input, one of a first series of pages, a second series of pages, and a third series of pages. The first series of pages are configured to allow a user to select at least one of products and services from at least one business line before the first series of pages request personal information. In addition, the second series of pages are configured to indicate whether currently received services at a first location are available at a second location. Moreover, the third series of pages are configured to allow the user to select at least one of products and services from the at least one business line. Furthermore, the third series of pages may be configured to allow the user to make this selection after the third series of pages request the personal information.

Consistent with an embodiment of the present invention, the aforementioned memory, processing unit, and other components are implemented in a shopping system, such as an exemplary shopping system 100 of FIG. 1. Any suitable combination of hardware, software, and/or firmware may be used to implement the memory, processing unit, or other components. By way of example, the memory, processing unit, or other components may be implemented with any of a customer processor 105 or a shopping processor 110, in combination with system 100. The aforementioned system and processors are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 includes customer processor 105, shopping processor 110, a user 115, and a network 120. User 115 may be an individual, for example, desiring to shop using shopping processor 110. User 115 may also be an organization, enterprise, or any other entity having such desires.

As illustrated in the block diagram of FIG. 1, shopping server 110 includes a processing unit 125 and a memory 130. Memory 130 includes a shopping software module 135 and a shopping database 140. Software module 135 residing in memory 130 is executed on processing unit 125 and may access shopping database 140. While executing on processing unit 125, software module 135 performs embodiments of the invention including, for example, the process or portions of the process described below with respect to FIG. 2.

Customer processor 105 and shopping processor 110 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

Network 120 may comprise, for example, a VPN, a local area network (LAN), or a wide area network (WAN). Such networking environments are commonplace in offices, enterprise-wide computer networks, intranets, and the Internet. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques. Furthermore, network 120 may also comprise a virtual private (VPN), operated, for example over a public network such as the network.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

System 100 may also transmit data by methods and processes other than, or in combination with, network 120. These methods and processes may include, but are not limited to, transferring data via, diskette, flash memory sticks, CD ROM, facsimile, conventional mail, an interactive voice response system (IVR), or via voice over a publicly switched telephone network.

Figure 2:
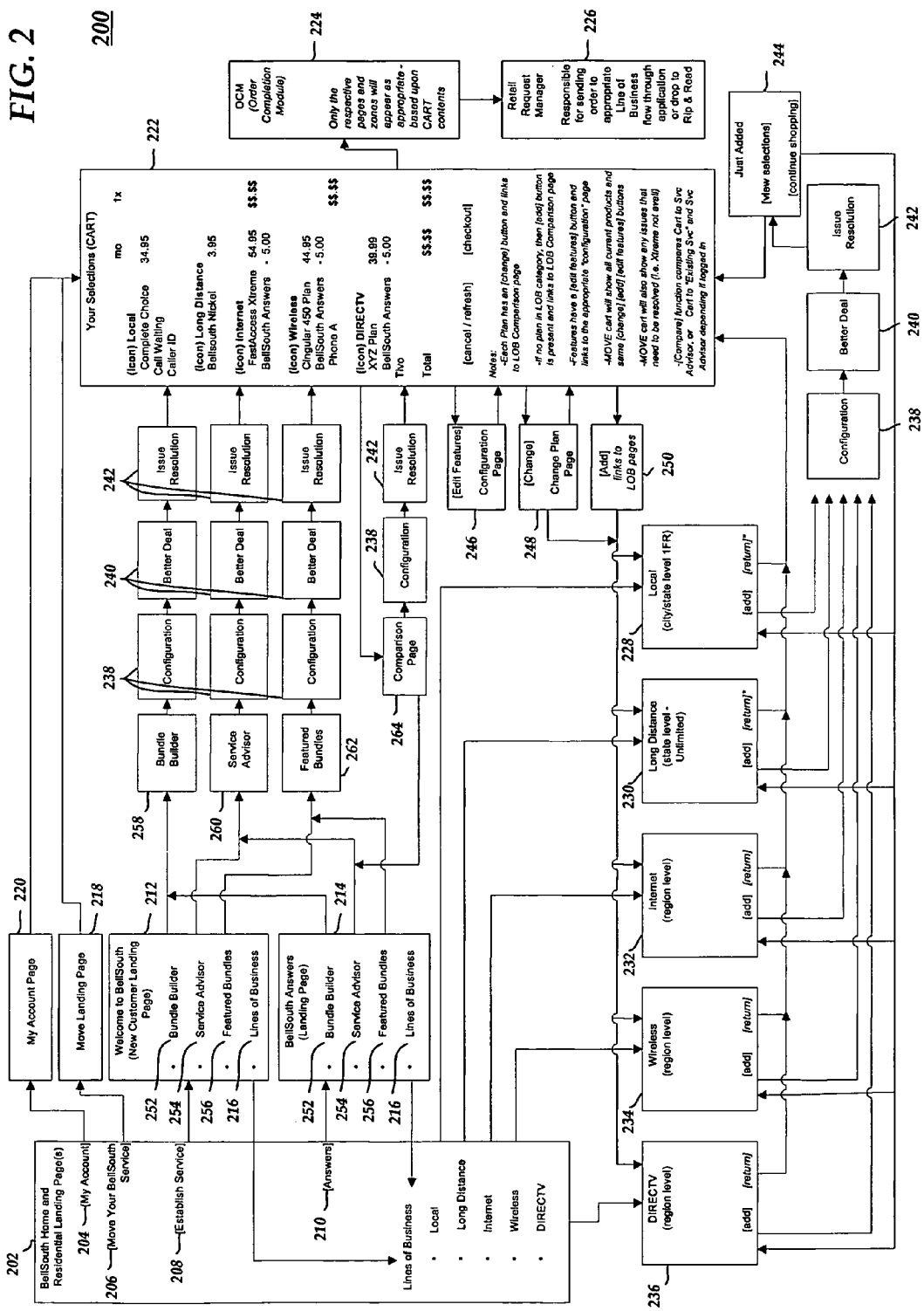
FIG. 2 is a block diagram of an exemplary shopping model consistent with an embodiment of the present invention.
Figure 5A:
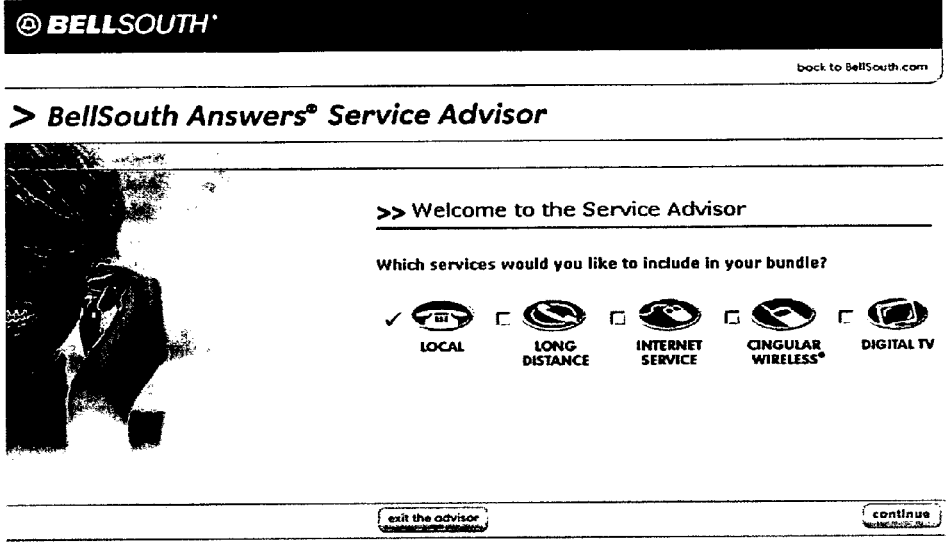
Figure 5B:
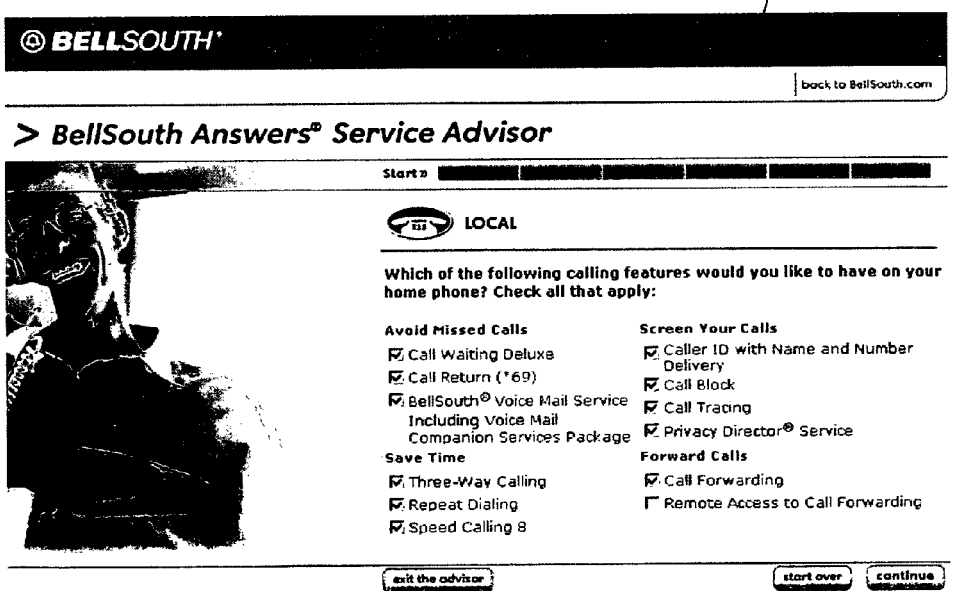
Figure 6A:
Figure 6B:

FIG. 2 is a block diagram of an exemplary shopping model 200 consistent with an embodiment of the present invention. For example, using customer processor 105, user 115 connects to shopping processor 110 over network 120. Accordingly, customer processor 105 and shopping processor 110 exchange data over network 120 (e.g. exchange web pages) in order to carry out the process described below with respect to FIG. 2. As shown in FIG. 2, user 115 accesses a home page 202. From home page 202, user 115 selects one of a plurality of selections comprising a my account button 204, a move service button 206, an establish service button 208, and an answers button 210. By providing user 115 with these plurality of sections, user 115 chooses one of a plurality of paths in shopping model 200 that best matches user's 115 mindset. Accordingly, the user fall-out experienced in conventional systems is avoided. For example, the plurality of paths offered by shopping model 200 may be classified as new orders (N-order), transfer orders (T-order), and change orders (C-order). Regardless of the chosen path, user 115 is eventually directed to a cart page 222 that is described in greater detail below. From cart page 222, shopping model 200 completes user's 115 order through an order completion model 224 and a retail request manager 226. Retail request manager 226 is responsible for sending user's 115 order to, for example, functional units within the service provider in order to fulfill user's 115 order.

With the N-order path, user 115 can start shopping right away by using catalog/marketing pages for each line of business offered by the service provider. These catalog/marketing pages are reached through an establish service page 212 or an answers page 214. For example, user 115 may click a line of business button 216. Consistent with embodiments of the present invention, with the N-order path, user 115 may go directly into a shopping mode without being diverted with procedural issues. For example, the N-order path allows the user to: i) stay anonymous; ii) engage in a shopping mode first, putting products or services into a virtual shopping cart; and iii) then go into a purchasing mode after user 115 has done all of their shopping, for example, to validate their selections. While conventional systems get users into an ordering flow and, within that flow, allows users to do their shopping, the conventional systems have considerable fall-out partially through the shopping process. This is because the user is in a shopping mindset, but drops out of the shopping process because they are forced to carry out non-shopping oriented tasks at multiple stages in the shopping process. These non-shopping oriented tasks may comprise having the user provide personal information such as a passwords or payment and address information. Consistent with embodiments of the invention, the N-order path allows user 115 to shop first, review the shopping cart, and then either save the shopping cart for future use when user 115 comes back, or because user 115 may need to review the cart with someone else (e.g. a spouse.)

If user 115 clicks line of business button 216 from establish service page 212 or answers page 214, user 115 may be directed to one of a plurality of lines of business pages. From these lines of business pages, user 115 may shop "a la cart" for various services offered by the service provider. The plurality of lines of business pages may comprise a local telecommunication service page 228, a long distance telecommunication service page 230, an internet service page 232, a wireless service page 234, and a digital television (TV) page 236. From these plurality of lines of business pages, user 115 may pick and choose what products or services desired.

Consistent with embodiments of the invention, the service provider may provide cost discounts based on certain product and service combinations. Accordingly, once user 115 has established a certain combination of products and/or services, a configuration module 238 allows the customer to configure/personalize their lines of business selection. For example, for each line of business, a different personalization page may be presented. From here, if a better deal is appropriate, a better deal page 240 (FIG. 3) may be presented where user 115 is given an opportunity to change the currently selected combination. As shown in FIG. 3, shopping model 200 shows user 115 a service bundle 305 that is cheaper and includes more services than user's 115 currently selected combination 310. Any issues created by conflicts created between items in the shopping cart and what the user is trying to put in the shopping cart (e.g. two long distance plans), the products or services put into the shopping cart or the currently selected combination, in response to better deal page 240, may be resolved by an issue resolution model 242. User 115 is given the option to continue shopping or to go to cart page 222 from a just added page 244.

Figure 4:
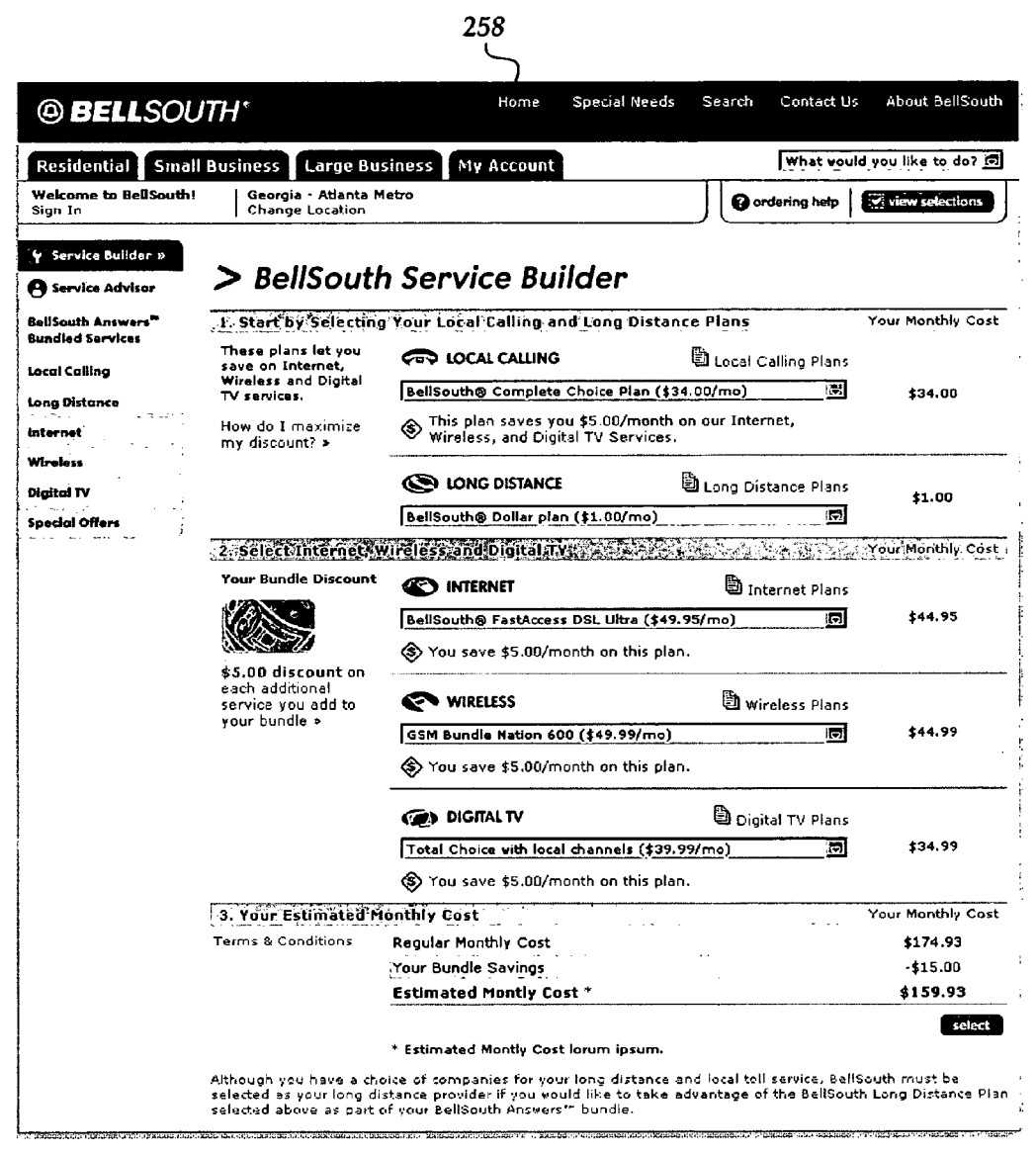

From establish service page 212 or from answers page 214, user 115 may select a bundle builder button 252, a service advisor button 254, or a featured bundles button 256 and be respectively directed to a bundle builder page 258 (FIG. 4), a series of service advisor pages 260 (FIGS. 5a, 5b, 6a, 6b, 7a, 7b, and 8), or a featured bundle page 262. Through bundle builder page 258, more experienced users may pick and choose products or services from each service line. Through the series of service advisor pages 260, user 115 answers some lifestyle type questions and then shopping model 200 recommends, for example, a couple of service bundles based on how user 115 answered the aforementioned questions. For example, through the series of questions as shown in FIGS. 5a, 5b, 6a, 6b, 7a, 7b, and 8, user 115 may be asked how they intend to use products or services offered in the plurality of business lines. Through featured bundle page 262, the service provider can allow user 115 to see what the service provider is featuring at the time. For example, the service provider may wish to gain DSL customers in the current month and may feature DSL service at a reduced price for a limited time.

As shown in FIG. 2, from bundle builder page 258, series of service advisor pages 260, or featured bundle page 262, user 115 may be directed through configuration module 238, better deal page 240, and issue resolution module 242 as described above. Furthermore, directly from cart page 222, user 115 may be directed to a comparison page 264 and then directed through bundle builder page 258, series of service advisor pages 260, or featured bundle page 262 as described above. The comparison page may allow the user to compare between what is in the shopping cart and what the service provider recommended or what is in their shopping cart compared to their existing account.

Figure 9:
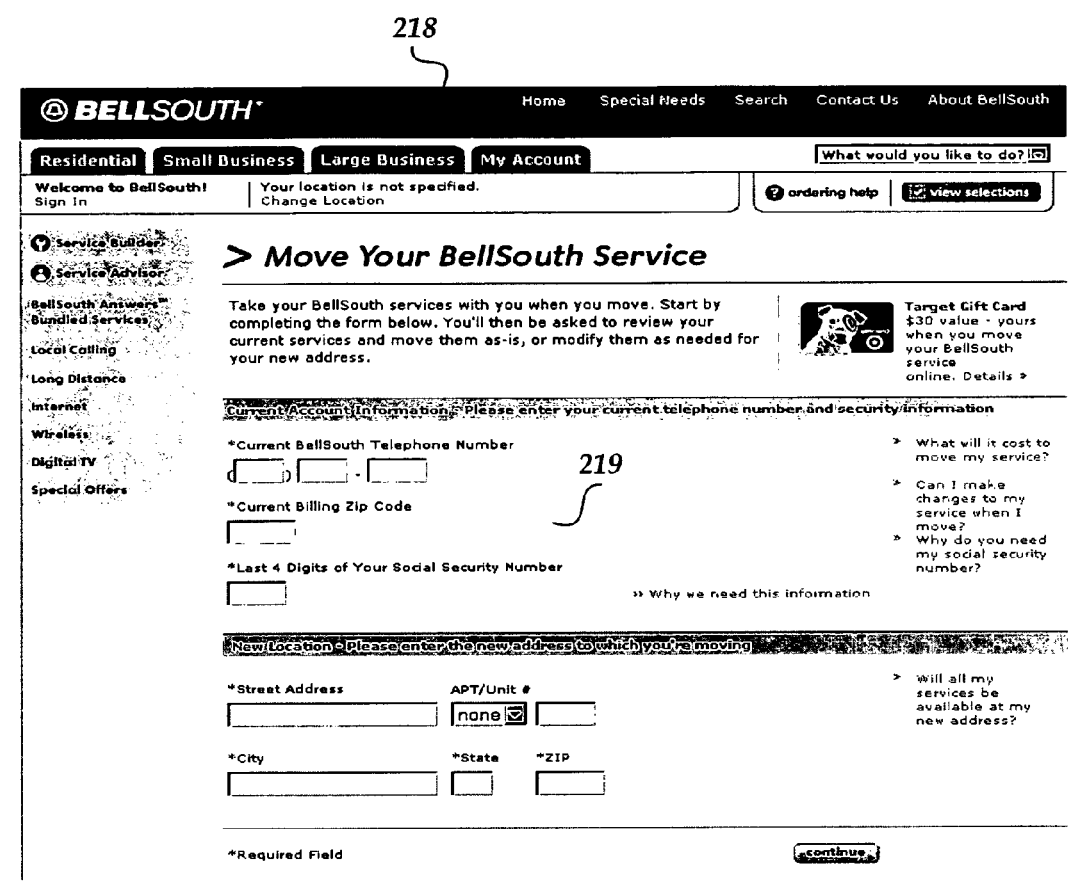

Moreover, user 115 can select the T-order path from home page 202 by selecting move service button 206 and going to a move page 218 (FIG. 9.) (Note that upper section 219 may not be shown if user 115 had already logged in.) For example, move page 218 may be dynamically presented based on the customer's state. From move page, user 115 may be directed to cart page 222 pre-populated with user's 115 current services. Consistent with embodiments of the invention, shopping model 200 determines if user's 115 current services are available at a location where that user 115 intends to move. As shown in FIG. 10, if any service, for example digital subscriber line (DSL) service, is not available at the location where user 115 intends to move, cart page 222 brings this to user's 115 attention with a message 1002, for example. User 115 is given an opportunity to change, delete, or add the current service received from the service provider, and is given the option to move "as is" if all current services are available at the location where user 115 intends to move.

Figure 11:
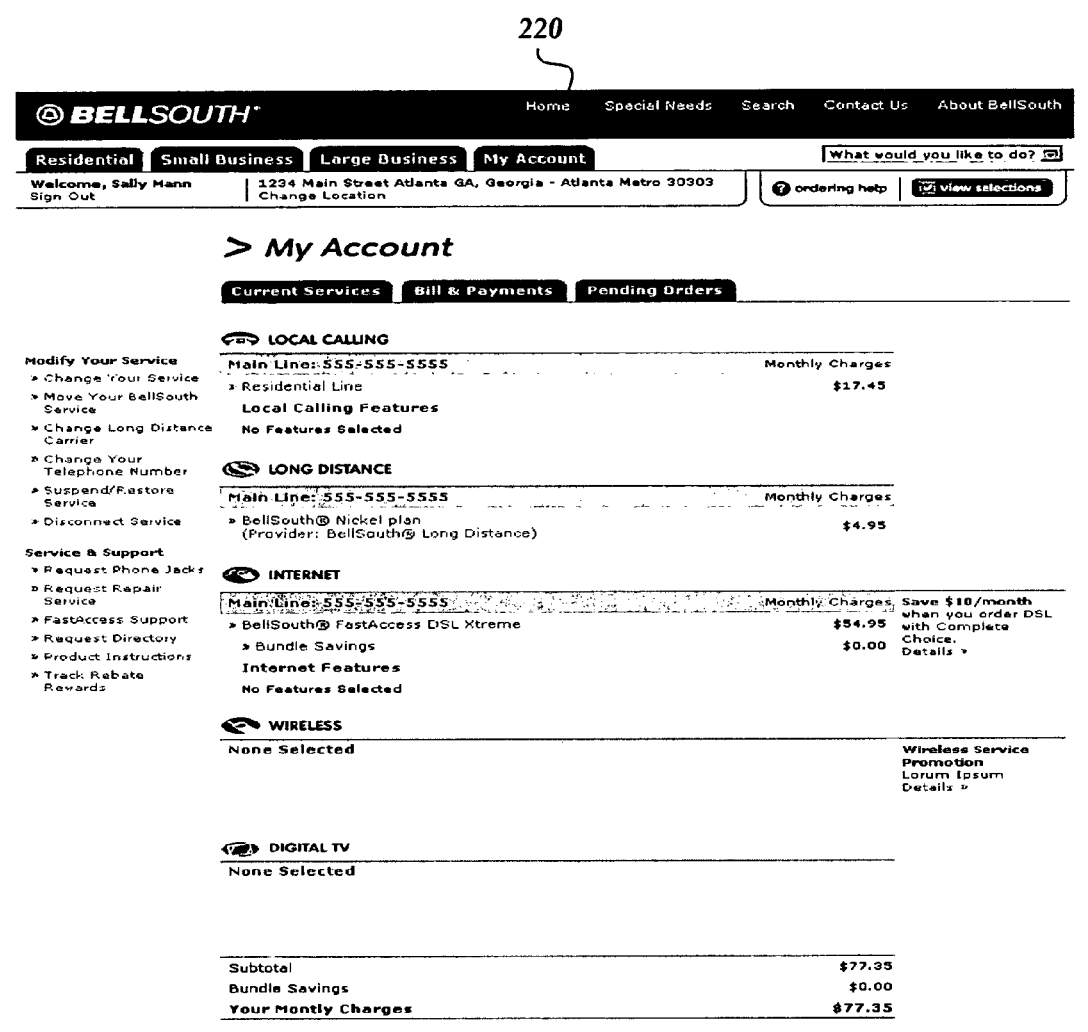
Figure 12:
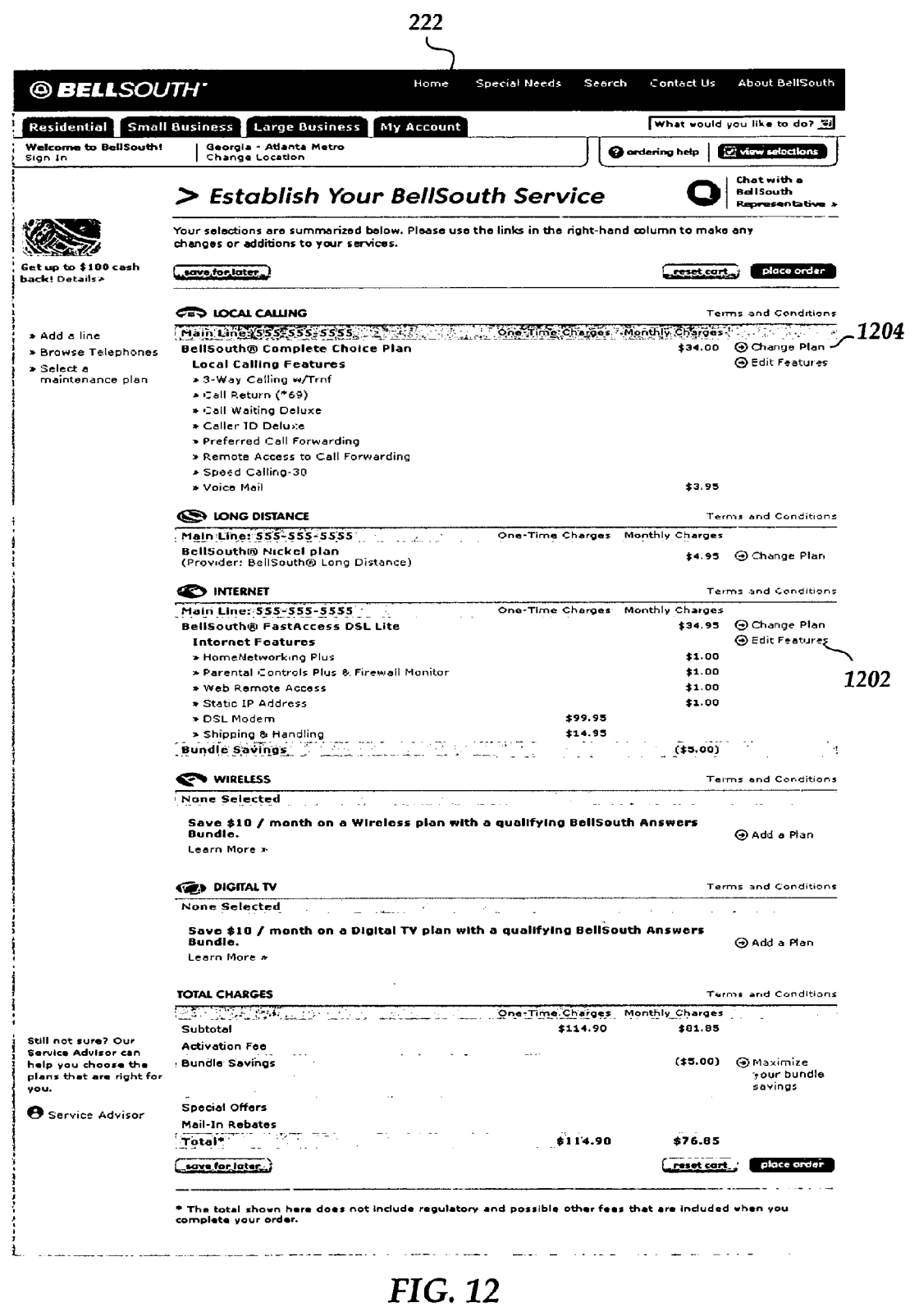
Figure 14:
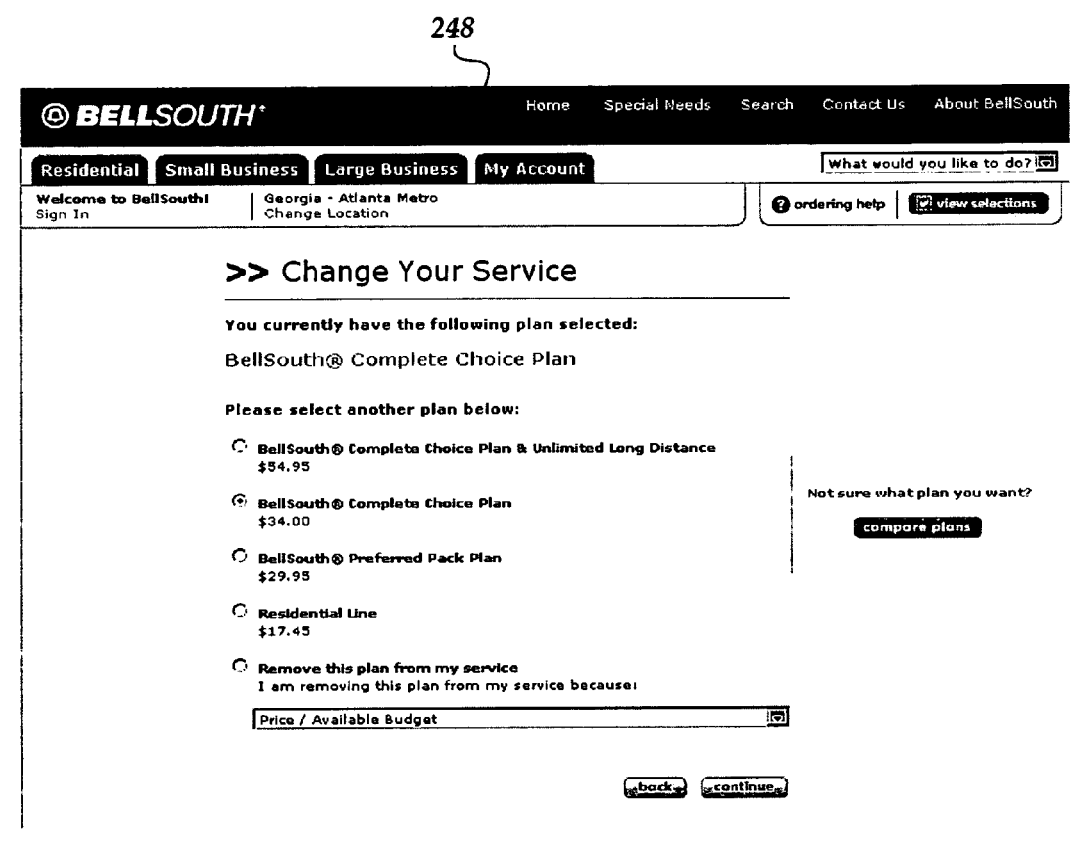

In addition, user 115 can select the C-order path from home page 202 by selecting my account button 204 and going to a my account page 220 populated with user's 115 current services (FIG. 11.) From account page 220, user 115 is directed to cart page 222 (FIG. 12.) After viewing cart page 222, user 115 may want to add, change, or delete the currently selected products or services. If user 115 wants to edit the currently selected products or services, user 115 can go to an edit feature page 246 (FIG. 13) by clicking an edit feature button 1202. Moreover, if user 115 wants to change the currently selected products or services, user 115 can go to a change feature page 248 (FIG. 14) by clicking a change plan button 1204. Furthermore, if user 115 wants to add to the currently selected products or services, user 115 may be directed to any of the plurality of lines of business pages as described above through add feature page 250. Furthermore from "my account" page 220, user 115 may, for example, change, perform non-sales related transaction such as change long distance carrier suspend service, suspend service, or order jacks and wiring.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention is described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments may exist from consideration of the specification and practice of the embodiments of the invention disclosed herein. Furthermore, although embodiments of the present invention have been described as being associated with data stored in memory and other storage mediums, these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for providing a consumer shopping experience over a network, the method comprising:

receiving, by a shopping processor, a user input over the network;

providing, by the shopping processor, to the user over the network, in response to the user input, one of a first series of pages and a second series of pages, wherein, the first series of pages are configured to allow a user to select at least one of products and services from at least one business line and the second series of pages are configured to indicate whether currently received services at a first location are available at a second location and which of said currently received services are not available at said second location; and responsive to the user selecting a plurality of products or services a la cart, providing by the shopping processor to a user computer, a web page configured for displaying a better deal configuration to the user when a better deal exists, wherein the better deal configuration provides at least the plurality of a la cart products and services at a price that is less than a price quoted for the plurality of products or services.

2. The method of claim 1, wherein the first series of pages are configured to allow the user to select the at least one of products and services from the at least one business line comprising at least one of the following: local telecommunication service, long distance telecommunication service, wired or wireless voice service, wired or wireless data service, and television (TV) service.

3. The method of claim 1, wherein providing, in response to the user input, one of the first series of pages, and the second series of pages, wherein at least one of the first series of pages correspond to a new order and the second series of pages correspond to a transfer order.

4. The method of claim 1, wherein the second series of pages are configured to indicate whether currently received services at the first location are available at the second location wherein the second location is a location where the user indicates an intention to move to.

5. The method of claim 1, wherein the first series of pages provides at least one of a page corresponding to a bundle builder and a page corresponding to at least one featured bundle.

6. The method of claim 1, further comprising postponing, by the shopping processor, a request for personal information from the user until after the user has selected said at least one product or service, wherein the personal information comprises at least one of the following: a password, payment data, personal information, and address information.

7. A system for providing a consumer shopping experience, the system comprising:
 a memory storage; and
 a processing unit coupled to the memory storage, wherein the processing unit is operative to:
  receive a user input;
  provide, in response to the user input, one of a first series of pages and a second series of pages, wherein,
   the first series of pages are configured to allow a user to select products and services a la cart from at least one business line, and
   the second series of pages are configured to indicate whether currently received services at a first location are available at a second location and, when at least some of said currently received services are not available at said second location, indicate which of said currently received services are not available at said second location; and
  responsive to the user selecting a plurality of products or services a la cart from a selected business line, displaying a bundle configuration to the user when a better deal exists, wherein the bundle configuration comprises a better deal when the bundle configuration provides at least the a la cart products and services at a price that is less than a price quoted for the a la cart products or services.

8. The system of claim 7, wherein the first series of pages are configured to allow the user to select the a la cart products and services from the at least one business line comprising at least one of the following: local telecommunication service, long distance telecommunication service, wired or wireless voice service, wired or wireless data service, and television (TV) service.

9. The system of claim 7, wherein at least one of the first series of pages correspond to a new order and the second series of pages correspond to a transfer order.

10. The system of claim 7, wherein the second series of pages are configured to indicate whether currently received services at the first location are available at the second location wherein the second location is a location where the user indicates an intention to move to.

11. The system of claim 7, wherein the first series of pages and the provides at least one of a page corresponding to a bundle builder and a page corresponding to at least one featured bundle.

12. A non-transitory computer-readable medium which stores a set of instructions, which, when executed, performs a method for providing a consumer shopping experience, the method executed by the set of instructions comprising:
 receiving a user input;
 providing, in response to the user input, one of a first series of pages and a second series of pages, wherein,
  the first series of pages are configured to allow a user to select a plurality of products and services a la cart before the first series of pages request personal information
  the second series of pages are configured to indicate whether currently received services at a first location are available at a second location and which of said currently received services are not available at said second location;
 providing a service advisor page to the user, wherein the service advisor page presents at least one of the following: a featured product, service, and bundle from the at least on business line according to the selection by the user of the a la cart products and services from the at least one business line; and
 responsive to determining a better deal configuration, displaying the better deal configuration to the user, wherein the better deal configuration provides at least the plurality of a la cart products and services at a price that is less that a price quoted for the plurality of products or services.

13. The computer-readable medium of claim 12, wherein the first series of pages are configured to allow the user to select the a la cart products and services from the at least one business line comprising at least one of the following: local telecommunication service, long distance telecommunication service, wired or wireless voice service, wired or wireless data service, and television (TV) service.

14. The computer-readable medium of claim 12, wherein providing, in response to the user input, one of the first series of pages and the second series of pages, wherein at least one of the first series of pages correspond to a new order and the second series of pages correspond to a transfer order.

15. The computer-readable medium of claim 12, wherein the second series of pages are configured to indicate whether currently received services at the first location are available at the second location wherein the second location is a location where the user indicates an intention to move to.

16. The computer-readable medium of claim 12, wherein the first series of pages provides at least one of a page corresponding to a bundle builder and a page corresponding to at least one featured bundle.

17. The computer-readable medium of claim 12, wherein the personal information comprises at least one of the following: a password, payment data, personal information, and address information.

* * * * *